No. 820,950. PATENTED MAY 22, 1906.
K. A. BODE.
MEDICAL INSTRUMENT.
APPLICATION FILED NOV. 9, 1905.

Witnesses
Estelle V. Wale.
S. Herzog.

Inventor
Karl August Bode
By his Attorney
Max W. Ordmann

UNITED STATES PATENT OFFICE.

KARL AUGUST BODE, OF NEW YORK, N. Y.

MEDICAL INSTRUMENT.

No. 820,950. Specification of Letters Patent. Patented May 22, 1906.

Application filed November 9, 1905. Serial No. 286,594.

*To all whom it may concern:*

Be it known that I, KARL AUGUST BODE, a subject of the German Emperor, residing at New York city, in the county of New York and State of New York, have invented certain new and useful Improvements in Medical Instruments, of which the following is a specification.

The present invention pertains to medical instruments, and particularly to instruments for the treatment of internal and external diseases by nebula or steam.

Particularly for diseases of the mucous membrane—as that of the vagina, nose, ear, or throat—a steam treatment is of great advantage. Hitherto such treatment has been difficult, owing to the hot steam scalding the parts to be treated.

The object of my present invention is to provide a simple instrument whereby the steam conveyed from a steam-generator can be deprived of its scalding capacity. In other words, the steam can be cooled or dried before it comes in contact with the mucous membrane or any other part to be treated. To accomplish this object, I force the steam to pass at first through a perforated mouthpiece, whereby its force is greatly reduced, and by lowering more or less a dish or funnel shaped receiver toward the mouthpiece, which receiver is attached to the end of a tube adapted to convey the steam to the part to be treated, the steam is cooled more or less.

In order to make my invention more clear, I have illustrated the same in the accompanying drawings, in which similar reference-letters denote corresponding parts, and in which—

Figure 1:
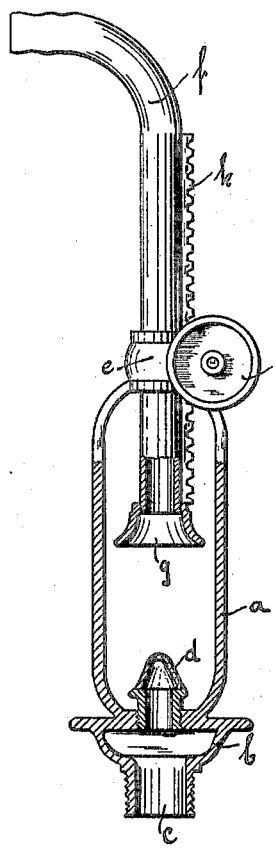
Figure 2:
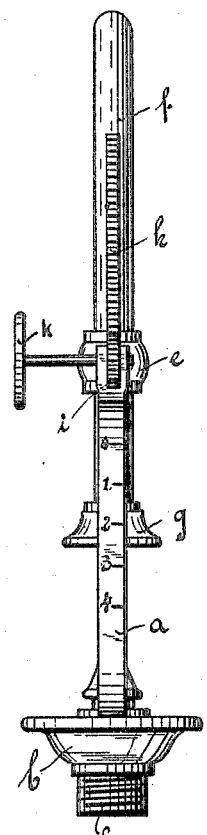
Figure 3:
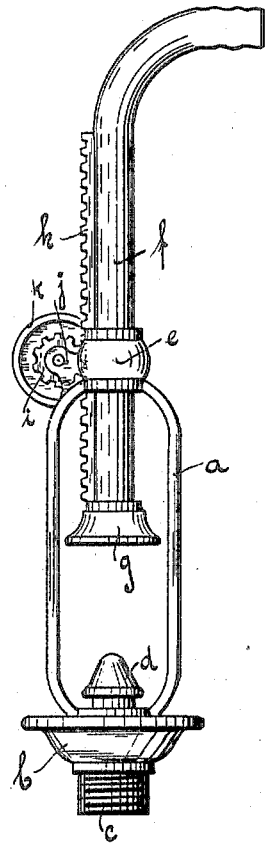

Figure 1 is a left side view of the device embodying my invention, Fig. 2 a rear view, and Fig. 3 a right side view thereof.

In the drawings, $a$ illustrates a bow-shaped frame, the lower end of which carries a receptacle $b$, which is provided at its bottom with a hollow neck $c$, having screw-thread on its outside. On the closed top of the receptacle and communicating therewith is a perforated mouthpiece $d$. By means of the threaded neck $c$ the frame is adapted to be screwed onto the boiler or steam-generator.

The upper end of the bow-shaped frame $a$ is formed to a sleeve $e$, which is adapted to loosely bear a tube $f$. This tube is capable of being moved up and down in said sleeve $e$. The lower end of the tube is provided with a dish or funnel-shaped projection or receiver $g$, which extends toward the mouthpiece $d$ and is adapted to convey the steam rising from the latter into the tube $f$, which conveys the steam to the part to be treated.

The upward and downward movement of the tube $f$ through the sleeve $e$ is effected by means of a longitudinal rack $h$, formed on one side of the tube $f$. Meshing with this rack is a pinion $i$, suitably borne in brackets $j$, projecting laterally from the cap $e$ and provided at one end with a hand-wheel $k$.

On one side the bow-shaped frame is provided with a graduation marked from the top downward "0, 1, 2, 3, 4," which will serve to indicate the position occupied by the funnel $g$. When the latter is at "0," the steam rising from the mouthpiece $d$ will be cooled to a maximum when it reaches the funnel and can be used for the treatment of mucous membrane, as that of the vagina, nose, ear, throat, &c. By lowering the funnel up to the mark "1" the steam when reaching the funnel will be hotter, and so on.

When the funnel is lowered up to the mark "4," the steam is still hotter and can be advantageously used for the treatment of external diseases, as that of the face or the like, without scalding the parts treated.

What I claim, and desire to secure by Letters Patent, is—

1. A medical instrument comprising a bow-shaped frame, a hollow outwardly-threaded neck arranged at one end of said frame and adapted to be secured to the steam-generator, a perforated mouthpiece communicating with said neck, a sleeve at the other end of the bow-shaped frame, a tube movably guided in said sleeve, a funnel-shaped projection or receiver at the inner end of the tube and directed toward the perforated mouthpiece and means for effecting a longitudinal movement of the tube in relation to said mouthpiece, substantially and for the purpose as specified.

2. A medical instrument comprising a bow-shaped frame, a hollow outwardly-threaded neck arranged at one end of said frame and adapted to be secured to the steam-generator and a perforated mouthpiece communicating with said neck, a sleeve at the other end of the bow-shaped frame, a tube movably guided in said sleeve, a funnel-shaped projection or receiver arranged at the inner end of the tube and directed toward the perforated mouthpiece, a rack at one side of the tube, a pinion meshing with said rack and supported in the frame, a hand-wheel connected with the pinion, and a graduation at one side of the frame, substantially and for the purpose as specified.

In testimony whereof I affix my signature in presence of two witnesses.

KARL AUGUST BODE.

Witnesses:
MARIE BODE,
SIDNEY A. DUBOIS.